United States Patent Office 3,234,167
Patented Feb. 8, 1966

3,234,167
LIGHT-STABLE AROMATIC POLYESTERS
Wilfred Sweeny, Wycliffe, Wilmington, Del., assignor to E. I. du Pont de Nemours and Company, Wilmington, Del., a corporation of Delaware
No Drawing. Filed Jan. 9, 1962, Ser. No. 165,217
16 Claims. (Cl. 260—30.4)

This invention relates to novel and useful light-stable aromatic polyesters and to shape articles prepared therefrom, particularly filamentary structures which exhibit a high degree of wash-set recoverability.

Among the large number of synthetic linear condensation polymers, certain polyamides and polyesters have received a notable degree of commercial acceptance. In particular, the polyesters have made possible the first approach to fabrics which are wash-wearable, i.e., fabrics which ideally resist mussing and wrinkling in use and which can be laundered and then worn without ironing. Fabrics composed of poly(ethylene terephthalate) filaments and blends thereof with cotton, have been widely utilized in shirts, blouses, and the like, where the ease-of-care properties (as compared with fabrics composed entirely of natural fibers) have found great popular appeal. Such fabrics are, however, generally not truly wash-wearable in that they generally require at least touch-up ironing to present a satisfactory appearance. In addition, such fabrics are generally characterized by a propensity to pilling, i.e., there is a tendency to the formation of small fibrous balls on the surface of the fabric. Such deficiencies hove somewhat reduced the attractiveness and utility of fabrics composed of such polyesters and their blends. In order to enlarge wash-wear advantages and improve wash-wear performance in existing end-uses and proposed other applications, a continuing search is in progress for new polymers which possess the structural attributes necessary to superior properties. A prime test for wash-wearability is the wash-set recovery test which can be performed on strands of yarn composed of the polymer undergoing screening.

One object of this invention is to provide polyesters for the production of filaments exhibiting a high degree of light stability and wash-set recovery. Another object is to provide stable solutions of such polyesters, from which shaped articles can readily be prepared. Yet another object is to provide shaped articles, particularly filamentary structures, composed of such polyesters. Other objects will appear hereinafter.

The objects of this invention are accomplished by providing aromatic polyesters consisting essentially of the recurring structural unit

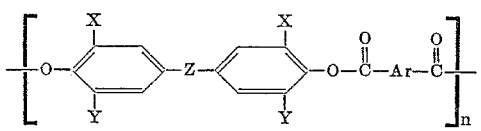

wherein $n$ is an integer so chosen that the molecular weight of the polymeric material is at least about 10,000 and may be as high as 200,000; Ar is meta- and/or para-arylene which may additionally bear one or more substituents selected from the group consisting of halogen and monovalent lower alkyl radicals; X is selected from the group consisting of halogen, lower alkyl, lower alkoxy, or other inert substituent and Y is selected from the group consisting of hydrogen, halogen, lower alkyl, lower alkoxy, or other inert substituent, with the proviso that X is halogen when Y is hydrogen; and Z is a carbon-to-carbon bond or a divalent radical chosen from among the following:

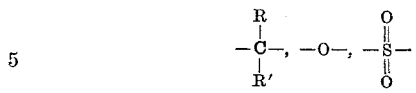

and other similar small divalent linking groups wherein R and R' may be the same or different, and represent lower alkyl groups or hydrogen, or may together constitute a cylic hydrocarbon group. The lower alkyl, lower alkoxy, and cyclic hydrocarbon groups referred to above, contain no more than about 6 carbon atoms. Small amounts, up to about 10% by weight, of units not conforming to the formula may be present in the polymer chain.

The polymers of this invention characteristically are high molecular weight, fiber-forming materials which have excellent stability to light and which can be processed into filamentary structures which have excellent wash-wear potential. These desirable attributes are readily evincible from testing of single filaments or yarns comprising the polyesters of the invention. Such filaments and yarns exhibit tenacity half-lives in excess of about 200 hours of exposure to visible and ultra-violet light of the Fade-Ometer and wash-set recovery angles in excess of at least about 270 degrees, and preferably in excess of 290 degrees.

The present invention also encompasses stable solutions of the above-described polyesters, solutions from which shaped articles composed of the instant polymers can readily be prepared as well as the articles themselves. Typically the solutions contain from about 15 to about 30% by weight of the polymer dissolved in a solvent selected from the class consisting of tetrahydrofuran, chloroform, cyclohexanone, N,N-dimethylacetamide, and a mixture of 70% 1,1,2-trichloroethane and 30% trifluoroacetic acid. The solutions ordinarily have viscosities between about 10 and about 500 poises; they remain stable in storage at low temperatures for at least 24 hours without developing a substantial viscosity rise or noticeable cloudiness. Moreover, such solutions are notably free from filterable materials, e.g., gelled polymer. This permits the preparation of films by casting or the preparation of filaments by wet or dry spinning, following which the articles can be oriented and crystallized, thereby developing the optimum in the way of ultimate physical properties.

The polyesters of the invention can be formed into light stable shaped articles. Such articles may consist entirely of the instant polymers, e.g., films and filaments, or only partly so, e.g., coated wire and laminated sheets. Preferred are those articles having the transverse dimension (diameter or thickness) greatly exceeded by the longitudinal dimension; such articles include films, fiber, filaments, strand, pellicles, fibrids, and the like. Particularly preferred are the filamentary structures because of the excellent wash-wear properties. The shaped articles are conveniently prepared from the above-described solutions by wet- or dry-spinning techniques; they also may be prepared by extrusion from plasticized melts of the polymer.

The polymers of this invention may be prepared in high molecular weight by either interfacial polymerization or solution polymerization techniques, under carefully controlled and critically chosen conditions of condensation. Most conveniently, the instant polymers may be prepared from nearly equimolar amounts of the appropriate bisphenol and aromatic diacyl halide by interfacial polymerization in the presence of a catalyst. In accordance with the usual interfacial polymerization procedure, the reactants are present in different liquid phases which are immiscible and which, in the preparation of the present polymers, constitute two solvent media. Thus, the bisphenol is dissolved in one solvent medium, the aromatic diacyl halide is dissolved in a second solvent medium immiscible with the first, the necessary catalyst is added, and the solutions are rapidly combined with vigorous agitation. Normally, an alkaline aqueous medium serves as the solvent for the bisphenol, and an organic solvent is utilized for the aromatic diacyl halide, said organic solvent being so chosen that it exerts a solvating effect on the polymer produced, either dissolving it completely or serving as a swelling medium. Suitable catalysts for this interfacial polymerization technique include the quaternary ammonium salts, phosphonium salts, sulfonium salts, hydrazinium salts, and their corresponding hydroxides. Condensation is effected at relatively low temperatures ranging from room temperature or above to 0° C. or even lower. Temperatures below room temperature are generally preferred.

The polymers of this invention may also be prepared from nearly equimolar amounts of the appropriate bisphenol and aromatic diacyl halide by solution polymerization in the presence of a suitable catalyst or acid acceptor. In accordance with the normal procedure where solution techniques are employed, the reactants are present in a common solvent which also serves as a solvent for the polymer under the conditions of condensation. Thus, the bisphenol and the diacid halide are dissolved in separate portions of the solvent chosen, the catalyst or acid acceptor is added, and the solutions are combined with agitation. The hydrogen halide which is evolved as a by-product of the condensation reaction may be effectively removed by the use of an acid acceptor as a tertiary amine, for which purpose an amine which has a high base strength is required. Suitable tertiary amines have $pk_a$ values of at least about 9 when measured in water at 25° C. Where higher temperatures are utilized, the hydrogen halide may be spontaneously volatilized.

Solution polymerization may be effected at temperatures ranging from 0° C. to 185° C. or above. The use of temperatures within the lower portion of this range, i.e., 0° C. to room temperature, is preferred. When in this low-temperature procedure, an acid acceptor is employed, it serves as a satisfactory catalyst. Catalysts of the type employed in interfacial polymerization are effective when higher temperatures are employed. By the use of such catalytic agents, condensations may be effected even with bisphenols which have hitherto been non-reactive under condensation polymerization conditions. Where high temperatures are employed, it is frequently possible to utilize the reflux temperature of the solvent chosen as a satisfactory temperature for condensation. It will be noted that the polymers of this invention are prepared by the condensation of bisphenols with diacid halides. The use of the latter is critical, inasmuch as the "direct" preparation of the polymers from bisphenols and free acids normally is not possible. The polymer-forming reaction may be carried out in a continuous manner, by which the reactants are continuously introduced to the reaction zone and the polymeric product is continuously prepared and withdrawn. Polymerization may also be accomplished in a batch process in which equimolar amounts of the reactants are initially introduced to a reaction vessel, the condensation polymerization is effected, and the product is isolated.

One or more suitable difunctional coreactants may be present during the preparative reaction. Such coreactants may be bisphenols or diacid halides differing from the principal materials, or they may be difunctional materials of other types. Where the coreactant is a bisphenol or diacid halide of a type different from those described herein, or where the coreactant is of a different chemical type (as a diamine to yield a polyesteramide, a bischloroformate to yield a copolyester, or the like), such copolymerizable material should comprise no more than about 10% of the total polymer. Coreactants with mixed functional groups may also be employed as hydroxy acid halides and the like.

The bisphenols which are useful in the preparation of the instant polymers have the structure

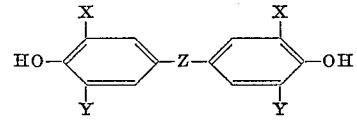

where X, Y, and Z have the same significance as set forth hereinabove. Other ring substituents also may be present, in addition to X and Y. The two aromatic rings in the bisphenol need not be identically substituted, so long as the X and Y groups are properly selected and positioned in each ring. Many of the bisphenols of this structure are commercially available; others may be prepared by the condensation of a lower alkyl ketone or aldehyde with two molecules of the substituted phenol. This reaction usually is carried out with or without an inert solvent in the presence of an acid; the reaction is summarized in the following equation wherein X, Y, R, and R' have the meanings as hereinabove described.

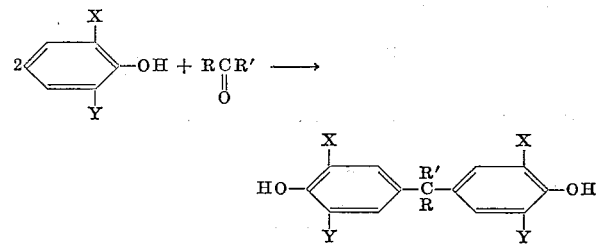

Still others of the bisphenols may be prepared by the corresponding condensation of a lower alkyl ketone or aldehyde with two molecules of unsubstituted phenol, followed by halogenation of the bisphenol to the desired substituted structure.

Preferred among the bisphenols which are useful in the practice of this invention are 4,4'-(isopropylidene bis (2,6-dichlorophenol), 4,4'-isopropylidene bis(2-chlorophenol), 4,4'-isopropylidene bis(2,6-dimethylphenol), 4,4'-isopropylidene bis(2,6-dibromophenol), 4,4'-isopropylidene bis(2-bromophenol), 4,4'-isopropylidene bis(2-chloro-6-methylphenol), 4,4-isopropylidene bis(2,6-dimethoxyphenol), the structures of which may be deduced from the following formula:

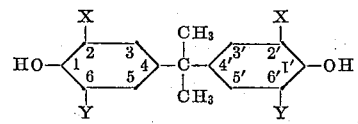

Also included in this listing are the methylene analogs, as 4,4'-methylene bis(2,6-dichlorophenol) and the like; the ethylidene analogs, as 4,4'-ethylidene bis(2,6-dimethylphenol) and the like; the propylidene analogs, as 4,4'-propylidene bis(2,6-dibromophenol) and the like; the n-butylidene analogs, as 4,4'-n-butylidene bis(2-chlorophenol) and the like; the isobutylidene analogs, as 4,4'-isobutylidene bis(2,6-dichlorophenol) and the like; the sec-butylidene analogs, as 4,4'-sec-butylidene bis(2,6-dimethylphenol) and the like; the cyclohexylidene analogs, as 4,4-cyclohexylidene bis(2,6-dibromophenol) and the like; and other similar analogs of the above substituted phenols. Further, the ether analogs, as 3,5,3',5'-tetrachloro-4,4'-dihydroxydiphenyl ether and the like; the sulfone analogs, as 3,5,3'5'-tetrabromo-4,4'-dihydroxydiphenyl sulfone and the like; and other similar analogs of the above substituted phenols are included in this listing, together with those wherein the aromatic nuclei are joined through a simple carbon-to-carbon bond, as 3,5,3',5'-tetrachloro-4,4'-dihydroxydiphenyl and the like.

The difunctional acid halides which are employed in the preparation of the instant polyesters have the structure $$XC-Ar-C-X$$
$$\overset{\|}{O}\quad\overset{\|}{O}$$

where X is halogen and where Ar is a meta- or paraphenylene group which also may be further substituted.

specified, while in all other instances there is no discoloration from degradation within the time shown and the first indication of such develops only on continued exposure. The time at which the first visible indication of the colored product of degradation appears is referred to as a "color break."

TABLE I

| Z | X | Y | Ar | Fade-Ometer Hours |
|---|---|---|----|-------------------|
| $-CH_2-$ | H | H | m-Phenylene | <10 |
| $-CH_2-$ | Cl | Cl | m-Phenylene | >100 |
| Bond | H | H | m-Phenylene | <2 |
| Bond | Cl | Cl | m-Phenylene | >200 |
| $C(CH_3)_2$ | H | H | m-Phenylene | <5 |
| $C(CH_3)_2$ | H | Cl | m-Phenylene | >200 |
| $C(CH_3)_2$ | Cl | Cl | m-Phenylene | >800 |
| $C(CH_3)_2$ | Br | Br | m-Phenylene | >100 |
| $C(CH_3)_2$ | $CH_3$ | $CH_3$ | m-Phenylene | >200 |
| $C(CH_3)(C_2H_5)$ | H | H | m-Phenylene | <5 |
| $C(CH_3)(C_2H_5)$ | Cl | Cl | m-Phenylene | >100 |
| $-C-$ <br> $\overset{|}{(CH_2)_5}$ | H | H | m-Phenylene | <5 |
| $-C-$ <br> $\overset{|}{(CH_2)_5}$ | Cl | Cl | 95%, m-Phenylene; 5%-p-phenylene | >260 |
| $-O-$ | H | H | m-Phenylene | <5 |
| $-O-$ | Cl | Cl | m-Phenylene | >100 |

The acid halides may be derived from the corresponding dicarboxylic acid by any one of several well-known methods; the diacid chloride is usually preferred.

Preferred among the diacid chlorides are isophthaloyl chloride, terephthaloyl chloride, mixtures of isophthaloyl and terephthaloyl chlorides, 2,5-dichloroterephthaloyl chloride, 5-t-butyl-isophthaloyl chloride, 2-chloroisophthaloyl chloride, 4-chloroisophthaloyl chloride, 5-chloroisophthaloyl chloride, and the like. Other substituent groupings may be present on the aromatic ring.

Preferred among the polyesters of this invention are the ones derived from isophthalic acid, 5-chloroisophthalic acid, 5-t-butylisophthalic acid, 4,4'-isopropylidene bis(2,6-dichlorophenol) and 4,4'-isopropylidene bis(2-chlorophenol). The singularly preferred polyester is poly[4,4'-isopropylidene bis(2,6-dichlorophenyl) isophthalate], which has the recurring structural unit:

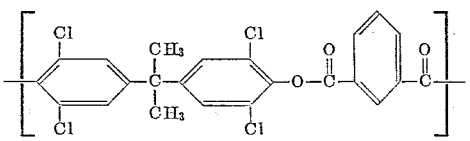

It has been noted that the polymers of this invention are derived from aromatic dibasic acid derivatives and from bisphenols which contain at least one nuclear substituent ortho to each hydroxyl function. The polymers of the invention are shown to be highly resistant to photolytic degradation, as seen in Table I below. In each instance, a polymer is utilized whose structure is of the following type:

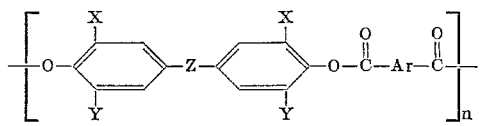

wherein each of Ar, X, Y, and Z have the designations shown in the table. The column entitled "Fade-Ometer Hours" indicates the number of hours over which a film of the subject polymer will withstand exposure to the visible and ultra-violet light of this instrument without discoloration, when examined in accordance with the test procedures hereinafter described. In those instances where values below twenty hours are reported, there is evidence of photolytic degradation within the time period From the above data, comparing films comprising polymeric structures which differ only in the presence or absence of nuclear substituents ortho to the hydroxyl groups of the bisphenols, it may be seen that the presence of such substituents is essential to light stability. It is noted that the number of hours of exposure in the Fade-Ometer without a color break is increased by a factor of at least about 10 by the introduction of suitable substituents, is normally increased by a factor of at least about 20, and is, in some instances, increased by a factor of 100 or more. Qualitatively, it is shown that films of all of the polyesters which bear substituents of this type are capable of withstanding at least about 100 hours of exposure without development of color, while none of the corresponding unsubstituted polyesters can withstand more than 10 hours of such exposure. The criticality of such substituents is unquestionable, where materials resistant to degradation by light are required or desirable.

The polymers of this invention possess a number of attractive and useful physical properties above and beyond their outstanding light stability. In the first place, these polymers are quite high-melting materials with melting points generally exceeding about 300° C., the crystalline melting point of the particularly preferred poly[4,4'-isopropylidene bis(2,6-dichlorophenyl) isophthalate] being in excess of 350° C. Moreover, the instant polymers are readily and permanently orientable by attenuation and can be obtained in a highly crystalline state. The polymers are notably hydrophobic with good resistance to chemical attack. The inherent viscosities of these polymers ordinarily exceed about 0.6, thereby rendering them suitable for the preparation of shaped articles. The second order transition temperatures (Tg) of the polymers of this invention are quite high, usually exceeding about 200° C., which makes substantially permanent heat setting entirely feasible. These and other noteworthy properties will be further apparent from the discussion and the examples which follow.

The outstanding properties of the present polymers render them eminently suited for conversion to filamentary structures. The conversion can be carried out readily using the solutions of the invention. For example, using a tetrahydrofuran solution containing 26% by weight of 0.7–0.9 inherent viscosity poly[4,4'-isopropylidene bis(2,6-dichlorophenyl) isophthalate] filaments of good quality can be prepared by dry-spinning, as described in the examples which follow. Filaments may also be prepared by wet-spinning, plasticized melt spinning and other known techniques. The filaments can be oriented by attenuating them about 2 or more times their undrawn (as-spun) length at a temperature of about 210–235° C.; they are crystallized by passing over a plate maintained at a temperature (260° C.) above the second order transition temperature of the polymer.

The yarns of this invention are notably resistant to photolytic degradation and exhibit good wash-set recoverability. They have additionally a number of important thermomechanical properties which further extend their utility. Properly oriented and crystallized yarns composed of the present polymers are not only quite high melting, as pointed out hereinabove, but also have proportionately high zero-strength temperatures. These latter values ordinarily approach about 275–300° C. Such a combination of thermal properties extends the range of applicability of these yarns into high temperature end-uses; these properties also permit greater flexibility of processing during the preparation of the yarns and the finished articles made from them. In the finished articles, e.g., fabrics, these thermal properties are manifest in higher safe-ironing and pressing temperatures with the incidence of glazing, fused filaments, discoloration, etc., greatly reduced. The high second order transition temperatures permit heat setting of pleats, creases and the like in the fabrics with a high degree of permanency. Such pleats and the like are retained in normal use as long as the second order transition temperature is not subsequently exceeded. It is by virtue of these combined thermal properties that the yarns of this invention retain a substantial measure of their room-temperature mechanical properties at elevated temperatures, thereby further enhancing their over-all utility.

The yarns of this invention can be oriented by attenuation, i.e., by drawing in a conventional manner in one or more steps or stages of drawing. Preferably the drawing is carried out at a temperature approximately the second order transition temperature of the component polymer, especially at high draw ratios. The draw ratio, i.e., the ratio of the length of the drawn yarn to the length of the same mass of yarn prior to drawing, ordinarily is between about 1.5× and about 5.5×. The yarn is partially crystallized during the drawing operation; crystallization is completed and perfected with retention of molecular orientation by setting the yarn at substantially constant length with heat or other plasticizing medium. As a rule, orientation usually precedes crystallization when maximum properties are to be developed. Optionally, the yarn may be permitted to relax (shrink) during the setting step. This procedure also results in increased crystallization but is attended by a decrease in orientation. The compensating benefit is increased dimensional stability, e.g., extremely low shrinkage, in the yarn so treated.

The yarns of this invention exhibit excellent light stability. This property is evident in the behavior of the yarns on prolonged exposure to an intense source of light, e.g., after accelerated testing in a Fade-Ometer where the yarns are subjected to strong visible and ultraviolet radiation. No discernible discoloration of the instant filaments is seen after about 100 hours of such testing, and certain of the fibers are not discolored after 700–800 hours. Moreover, the tenacity half-lives of these yarns, i.e., the time needed to reduce the tenacity of the yarn to one-half its original value, ordinarily exceeds about 200 Fade-Ometer hours. For the purpose of testing the light durability and discoloration of shaped articles comprising polymers of this invention, samples of fibers or films were exposed to the light from a carbon arc in a Model FDA–R Fade-Ometer, manufactured by Atlas Electric Devices Co., Inc., Chicago, Illinois. The apparatus was operated in accordance with the standard procedure for dyed textiles (ASTM designation D506–55), except that the samples were mounted in a different manner. Films were stapled to the face of a piece of 91 pound white Bristol Index cardboard and a portion of each sample was covered by an additional strip of cardboard. Fibers were wound on the cardboard in the longer direction for physical testing, and in the short direction to form a single layered mat for color testing. The cardboard assembly was clipped at the top and bottom in the usual sample position of the instrument. Color changes were observed by comparing the exposed and unexposed areas in north sky light or equivalent light of about 50 foot candles or more on the surface. Observations were made as soon as the exposure period was completed.

The yarns of this invention, when properly oriented and crystallized, also exhibit outstanding wash-wear potential, as indicated by wash-set recovery data and confirmed by actual fabric testing. The wash-set recovery test is probably the best single indication of the wash-wear potential of a given yarn, short of the costly and time-consuming preparation and evaluation of fabrics woven from the test yarn. No other single property of a yarn has been found to correlate with wash-wear performance so well. Such properties as polymer melt temperature, hot-wet modulus, tensile recovery data, second order transition temperature and the like, while all being important to the ultimate performance of a yarn, still do not singularly or severally correlate with wash-wear performance. Moreover, the wash-set recovery test avoids the many uncertainties and ambiguities which stem from differences in fabric construction and the like. The test is simply applied: A sample of yarn is bent 360° around a 25 mil wire mandrel and placed under a load of 0.05 gram per denier. Then is soaked for 2 minutes in a 60° C. detergent solution, rinsed with clear room-temperature water, then dried for a period of one to two hours at controlled conditions of temperature (21° C.) and relative humidity (15%). It is then removed from the mandrel and permitted to recover with no load under the same conditions of temperature and humidity. The wash-set recovery is reported as the angle through which the bent yarn recovers under the above conditions and is expressed in degrees, the maximum recovery possible being 360°.

The yarns of this invention exhibit wash-set recovery angles in excess of about 300°. Indeed, the wash-set recovery angle of the preferred poly[4,4'-isopropylidene bis(2,6-dichlorophenyl) isophthalate] yarn approaches 350°, i.e., recovery from hot-wet deformation usually is substantially complete. For the sake of comparison, commercially-available yarns of poly(ethylene terephthalate) and poly[trans cyclohexane (1,4-dimethylene) terephthalate], exhibit wash-set recovery angles in the range 200–240°, depending on their processing. Manifestly, the instant yarns are demonstrably superior to the present commercial polyesters in regard to wash-wearability.

The following non-limiting examples are illustrative of the practice of preferred embodiments of the invention. In these examples, parts and percentages are expressed on a weight basis unless otherwise indicated, and inherent viscosities ($\eta$inh) have been determined in accordance with the following equation:

$$\eta\text{inh} = \frac{\ln \eta\text{rel}}{c.}$$

The relative viscosity ($\eta$rel) may be determined by dividing the flow time in a capillary viscometer of a dilute solution of the polymer by the flow time for the pure solvent. The concentration (c.) used in the examples is 0.5 gram of polymer per 100 ml. of solution, and the measurements are made at 30.0° C. Unless otherwise specified, inherent viscosities are measured in a mixed solvent comprising 40% by weight sym-tetrachloroethane and 60% by weight phenol.

Example I

A cold solution consisting of 4.576 grams (0.0125 mole) of 4,4'-isopropylidine bis(2,6-dichlorophenol), 110 ml. of water, 4.88 ml. of a 5.12 N sodium hydroxide solution, 1.0 gram of tetraethylammonium chloride, and 10 ml. of 10% aqueous "Duponol" ME (the registered trademark for a dry surface active agent comprising technical sodium lauryl sulfate) is placed in a Waring Blendor. While rapidly stirring the solution, a second cold solution comprising 2.538 grams (0.0125) mole of isophthaloyl chloride in 30 ml. of 1,1,2-trichloroethane is added, and the two-phase system is rapidly stirred for a period of five minutes. The resulting emulsion is poured into acetone to precipitate the polymeric product, which is separated by filtration. The polymer is washed with water and with a 1/1 alcohol/water mixture, and dried. It is found to exhibit an inherent viscosity of 1.37, a polymer stick temperature of 363° C., and a polymer melt temperature in excess of 386° C. Polymer prepared in this manner is amorphous, and the polyester is soluble in tetrahydrofuran, chloroform, N,N-dimethylacetamide, a 70/30 mixture of trichloroethane and trifluoroacetic acid, a 40/60 mixture of trichloroethane and phenol, and in other single and mixed solvents. Films and fibers of the polymer may be prepared from these solutions, as will be shown by subsequent example. $\eta=1.37$.

Example II

The polymer described in Example I is prepared by placing a cold solution comprising 4.576 grams (0.0125 mole) of 4,4'-isopropylidene bis(2,6-dichlorophenol), 4.88 ml. of a 5.12 N sodium hydroxide solution, and 110 ml. of water in a Waring Blendor and stirring rapidly during the addition of a cold solution comprising 2.538 grams (0.0125 mole) of isophthaloyl chloride in 30 ml. of 1,1,2-trichloroethane. Following five minutes of rapid stirring, the emulsion is treated with acetone, and the precipitated polymer is removed by filtration, washed with water and with a 1/1 mixture of alcohol and water, and dried. $\eta=0.35$.

Example III

The polymer described in Examples I and II is prepared by placing 4.576 grams (0.0125 mole) of 4,4'-isopropylidene bis(2,6-dichlorophenol), 5.00 ml. of a 5.02 N sodium hydroxide solution, 20 ml. of water, 2.5 ml. of 10% aqueous "Duponol" ME (the registered trademark for a dry surface active agent comprising technical sodium lauryl sulfate), and 0.5 gram of tetraethylammonium chloride in a round-bottom flask equipped with a mechanical stirrer and a reflux condenser. To this cooled solution is added, with stirring, a cold solution of 2.538 grams (0.0125 mole) of isophthaloyl chloride in 14 ml. of 1,1,2-trichloroethane, and stirring is continued for 30 minutes. The resulting emulsion is poured into acetone to precipitate the polymer, and the product is separated by filtration. The polyester is washed with water and with a 1/1 mixture of alcohol and water, and dried. $\eta=0.90$.

Example IV

A cold solution comprising 4.576 grams (0.0125 mole) of 4,4'-isopropylidene bis(2,6-dichlorophenol), 4.92 ml. of a 5.09 N sodium hydroxide solution, 110 ml. of water, and 10 ml. of 10% aqueous "Duponol" ME (the registered trademark for a dry surface-active agent comprising technical sodium lauryl sulfate) is placed in a Waring Blendor. While the solution is stirred vigorously, a solution of 2.538 grams (0.0125 mole) of isophthaloyl chloride in 60 ml. of 1,1,2-trichloroethane is rapidly added. Stirring is continued for a period of eight minutes, and the polymer is precipitated with acetone. The product is removed by filtration, washed with water and with a 1/1 alcohol/water mixture, and dried. By this procedure, the same polyester is prepared as that described in Examples I–III. $\eta=0.59$.

Example V

The polyester prepared in accordance with Examples I–IV is prepared by placing in a Waring Blendor a cold solution of 9.152 grams (0.025 mole) of 4,4'-isopropylidene bis(2,6-dichlorophenol), 9.56 ml. of a 5.24 N sodium hydroxide solution, 1.0 gram of tetraethylammonium chloride, and 50 ml. of water, and adding to this rapidly stirred solution a cold solution of 5.076 grams (0.025 mole) of isophthaloyl chloride in 100 ml. of tetrahydrofuran. Following five minutes of rapid stirring, the polymer is precipitated with water and removed by filtration. The product is washed several times with water and with a 1/1 alcohol/water mixture, and dried. $\eta=1.0$.

Example VI

A round-bottom flask is equipped with a mechanical stirrer and a condenser and to it are added 3.661 grams (0.01 mole) of 4,4'-isopropylidene bis(2,6-dichlorophenol) and 2.78 ml. of triethylamine and 50 ml. of chloroform. The resulting solution is cooled in an ice bath and 2.030 grams (0.01 mole) of isophthaloyl chloride are added in the solid state. Following a period of three hours, during which the solution is slowly stirred, the polymeric product is precipitated by the addition of petroleum ether. The polymer is separated by filtration, washed several times with a 1/1 alcohol/water mixture, and dried. The product is the same polymer as that described in each of the preceding examples. $\eta=0.5$.

Example VII

A round-bottom flask is equipped with a mechanical stirrer, a nitrogen inlet tube, an outlet tube for hydrogen chloride, and a condenser. To the flask are added 4.576 grams (0.0125 mole) of 4,4'-isopropylidene bis(2,6-dichlorophenol), 0.04 gram of triethylamine hydrochloride, and 25 ml. of o-dichlorobenzene. While blanketing the mixture with nitrogen, the flask and its contents are heated to a temperature of 150° C., and a solution of 2.030 grams (0.010 mole) of isophthaloyl chloride and 0.508 gram (0.0025 mole) of terephthaloyl chloride in 25 ml. of o-dichlorobenzene is added. While nitrogen is continually passed through the flask, the mixture is stirred and maintained by means of an oil bath at a temperature of 200° C. for a total of ten hours. After cooling the mixture, the polymer is precipitated by the addition of hexane, filtered, and washed with alcohol, a 1/1 alcohol/water mixture, and water prior to drying.

Example VIII

In a Waring Blendor is placed a cold solution comprising 3.66 grams (0.01 mole) of 4,4'-isopropylidene bis(2,6-dichlorophenol), 0.8 gram of sodium hydroxide, 1.0 gram of tetraethylammonium chloride, and 120 ml. of water. While the solution is rapidly stirred, a second cold solution of 2.38 grams (0.01 mole) of 5-chloroisophthaloyl chloride in 30 ml. of 1,1,2-trichloroethane is added rapidly, and rinsed into the reaction vessel with an additional 5 ml. of 1,1,2-trichloroethane. Rapid stirring is continued for a period of ten minutes, and the resulting polymer is precipitated by dilution of the reaction mixture with hexane. The product is collected by filtration, washed, and dried.

Example IX

A solution comprising 5.68 grams (0.02 mole) of 4,4'-isopropylidene bis(2,6-dimethylphenol) and 1.6 grams of sodium hydroxide in 25 ml. of water is placed in a blender jar. While rapidly stirring the mixture, a solution of 4.00 grams (0.0197 mole) of isophthaloyl chloride in 115 ml. of distilled methyl-ethyl ketone is added, followed by an additional 10 ml. of solvent to rinse in traces of the acid chloride. Following five minutes of rapid stirring, an additional 0.06 gram (0.003 mole) of isophthaloyl chloride dissolved in 5 ml. of methyl-ethyl ketone is added and stirring is continued for an additional period of five minutes. The reaction mixture is diluted with an equal volume of water and the polymer thereby precipitated is collected by filtration, washed, and dried.

The properties of the polymers prepared in accordance with the preceding examples are summarized in tabular form in the tables, together with the corresponding properties of numerous other polymers which are prepared by one of the processes above described. The method of preparation employed in each example may be determined from the reference example. Each of the polymers consists of recurring units of the formula hereinabove specified, and reproduced here for easy reference, the designations of X, Y, and Z being shown with each example, and the designation of Ar denoted by the name of the acid from which it is derived:

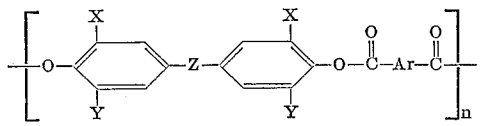

In the data included in the table, inherent viscosities are all determined in a 40% sym-tetrachloroethane-60% phenol solvent mixture. PMT refers to the polymer melt temperature, and the column entitled "Film" describes the solvent from which films are prepared (by code letters corresponding to the legend at the conclusion of the table). The Fade-Ometer measurement is a determination of the number of hours of exposure necessary to a color break, when the films (to which reference has previously been made) are tested. The fiber section of the table indicates the solvent medium in the solutions from which fibers are prepared (see legend for explanation of code letters), a summary of drawing conditions, values for tenacity, elongation, and modulus determinations, the wash-set recovery angle, and the yarn size in denier per filament.

*Example XXXV*

Poly[4,4'-isopropylidene bis(2,6-dichlorophenyl) isophthalate] having an inherent viscosity of 0.85 is dissolved in tetrahydrofuran to produce a solution containing 25.5% solids. The solution is cooled by means of an ice-water bath and maintained at a temperature of approxi-

TABLE II

| Example | Reference Example | Bisphenol | | | Acid Chloride | $\eta$ inh | PMT° C. | Film | Fade-Ometer, hrs. |
|---|---|---|---|---|---|---|---|---|---|
| | | Z | X | Y | | | | | |
| I, II, III, IV, V, VI | | C(CH₃)₂ | Cl | Cl | Isophthalic | (¹) | >386 | A | >800 |
| VII | | C(CH₃)₂ | Cl | Cl | 80% Isophthalic; 20% Terephthalic | 0.95 | 386 | A | >800 |
| VIII | | C(CH₃)₂ | Cl | Cl | 5-Chloroisophthalic | 1.01 | 330 | A | >300 |
| IX | | C(CH₃)₂ | CH₃ | CH₃ | Isophthalic | 0.6 | >400 | D | >200 |
| X | I | Bond | Cl | Cl | ___do___ | 0.98 | >400 | A | >300 |
| XI | I | Bond | Cl | Cl | 5-Chloroisophthalic | 0.69 | >400 | D | >200 |
| XII | I | C(CH₃)₂ | Cl | H | Isophthalic | 1.05 | 370 | E | 200 |
| XIII | I | C(CH₃)₂ | Cl | Cl | 4-Chloroisophthalic | 0.48 | 320 | A | >200 |
| XIV | I | C(CH₃)₂ | Cl | Cl | 80% 5-Chloroisophthalic; 20% Isophthalic | 0.48 | 323 | A | >200 |
| XV | I | C(CH₃)₂ | Cl | Cl | 5-tert-Butylisophthalic | 1.09 | 400 | A | 300 |
| XVI | I, VII | C(CH₃)₂ | Cl | Cl | 95% Isophthalic; 5% Terephthalic | 0.80 | 386 | A | >800 |
| XVII | I, VII | C(CH₃)₂ | Cl | Cl | 90% Isophthalic; 10% Terephthalic | 0.92 | 382 | A | >800 |
| XVIII | I, VII | C(CH₃)₂ | Cl | Cl | 85% Isophthalic; 15% Terephthalic | 0.88 | 386 | A | >800 |
| XIX | I | C(CH₃)₂ | Cl | Cl | 50% Isophthalic; 50% Terephthalic | 0.81 | >400 | A | >360 |
| XX | I | C(CH₃)₂ | Cl | Cl | 25% Isophthalic; 75% Terephthalic | 0.62 | >400 | A | >300 |
| XXI | I | C(CH₃)₂ | Cl | Cl | 20% Isophthalic; 80% Terephthalic | 1.24 | >400 | A | >300 |
| XXII | I | C(CH₃)₂ | Cl | Cl | 10% Isophthalic; 90% Terephthalic | 1.52 | >400 | A | >300 |
| XXIII | I | C(CH₃)₂ | Cl | Cl | 5% Isophthalic; 95% Terephthalic | 1.62 | >400 | A | >300 |
| XXIV | I | C(CH₃)₂ | Cl | Cl | Terephthalic | Insol. | >400 | | |
| XXV | I | C(CH₃)₂ | Cl | Cl | 2,5-Dichloroterephthalic | Insol. | >400 | | |
| XXVI | I | C(CH₃)₂ | Br | Br | Isophthalic | 0.86 | >380 | C | >100 |
| XXVII | I | C(CH₃)₂ | Br | Br | 70% Isophthalic; 30% Terephthalic | 0.88 | >380 | C | >100 |
| XXVIII | I | C(CH₃)(C₂H₅) | Cl | Cl | Isophthalic | 0.66 | 310-20 | A | >100 |
| XXIX | I | C(CH₃)(C₂H₅) | Cl | Cl | 5-tert-Butylisophthalic | 0.67 | 320 | | |
| XXX | I | C(CH₃)(C₂H₅) | Cl | Cl | Terephthalic | 0.84 | >400 | A | >100 |
| XXXI | I | -C-<br>(CH₂)₅ | Cl | Cl | 95% Isophthalic; 5% Terephthalic | 1.01 | >400 | A | >260 |
| XXXII | VIII | -O- | Cl | Cl | Isophthalic | 0.54 | >400 | C | >100 |
| XXXIII | VII | SO₂ | Cl | Cl | 70% Isophthalic; 30% Terephthalic | 0.48 | 366 | E | >300 |
| XXXIV | VII | SO₂ | Cl | H | 70% Isophthalic; 30% Terephthalic | 0.21 | 260 | | |

Legend to Solvent Codes:
A = tetrahydrofuran.
B = hexamethylphosphoramide.
C = N,N-dimethylacetamide.
D = chloroform.
E = N-methylpyrrolidone.
¹ As indicated.

TABLE III

| Example | Solvent (percent solids) | Drawing | Fiber | | Mi | WSRA | dpf |
|---|---|---|---|---|---|---|---|
| | | | T | E | | | |
| I, II, III, IV, V, VI ¹ | A(25) | 4X; 210°<br>Cryst. at 245° | 3.10 | 23.9 | 37.8 | 335° | 2.60 |
| VII | A | 1.7X; 225° | 2.18 | 23.5 | 29 | 325° | 2.33 |
| VIII | Melt | 1.8X; 260° | 2.03 | 43.4 | 26.6 | 325° | 29.5 |
| X | A(14) | 2.5X; 225° | 2.40 | 12.0 | 36.5 | | 6.0 |
| XII | A(23) | | 1.54 | 22 | 25.4 | 320° | 2.40 |
| XV | A(25) | 2.15X; 210° | 1.36 | 25.5 | 27.0 | 310° | 7.35 |
| XVI | A | 2.3X; 225° | 1.5 | 31 | 29 | 315° | 4.8 |
| XVII | A | 1.9X; 220° | 1.83 | 48.8 | 24.3 | 315° | 7.41 |
| XIX | A(21) | 3.8X; 220° | 1.35 | 21 | 26 | 320° | 3.42 |
| XX | A(28) | 1.8X; 140° | 1.5 | 32 | 25 | 275° | 8.20 |
| XXVII | A(21) | 1.9X; 210° | 1.40 | 28.9 | 25 | 320° | 8.04 |
| XXX | A(20) | 1.85X; 185° | 0.9 | 8.7 | 20 | 300° | 49 |

¹ These fibers are prepared from polymers as in Example I.

mately 5° C. until its introduction to the spinning cell, the temperature of which is below about 35° C. The solution is extruded through a spinneret having 17 holes of 0.005 inch diameter which is at a temperature of 31–32° C. A 10 ft. drying column, having a temperature of 42° C. at the top and 45° C. at the bottom, permits evaporation of the spinning solvent. The filamentary product is extracted with water or with a mixture of equal volumes of water and alcohol to remove the residual spinning solvent. Fibers of the same polymer may be prepared by a wet-spinning technique involving the use of the same spinning solution which is extruded through spinneret orifices into a 60% aqueous calcium thiocyanate coagulating bath.

*Example XXXVI*

Freshly spun fibers of poly[4,4'-isopropylidene bis(2,6-dichlorophenyl) isophthalate], prepared in accordance with the preceding example, are dried by means of a drying roll heated at a temperature of 130° C. The yarn is drawn 4.2X upon exposure to a 36-inch hot plate heated to a temperature of 225° C. Crystallization is effected by utilizing a second 36-inch hot plate heated to a temperature of 265° C. The properties of the yarn are in accordance with those listed for the polymer in Tables II and III.

*Example XXXVII*

A solution of poly[4,4'-isopropylidene bis(2,6-dichlorophenyl) isophthalate] in tetrahydrofuran is prepared by mixing the polymer and solvent while maintaining the temperature at about −10° C. Polymer of inherent viscosity of 0.81 is utilized, the final solution contains about 19% polymer, and solution viscosity is about 20 poises. The solvent employed is dried over phosphorous pentoxide prior to use to assure that it is in an anhydrous condition. The final solution is filtered through a one-inch layer of 150/200 mesh sand supported by 3 layers of heavy nylon filter cloth, and is stored at a temperature of −10° C. until utilized for wet-spinning. Immediately prior to being metered to the spinneret, the solution is filtered a second time through five layers of nylon filter cloth having an average pore radius of 2.3 microns. After being metered, the solution is passed through two layers of calendered "Dacron" (registered trademark) polyester filter cloth and through a felt of "Orlon" (registered trademark) acrylic fiber for further filtration, and is then passed through a spinneret having 30 orifices of 3-mil diameter, each orifice being constructed such that it possesses a 36° taper leading into the spinneret opening. The filamentary product is passed through a water bath for coagulation of the polymer and extraction of the solvent. The water bath is maintained at a temperature within the range of from about 15° C. to about 25° C. and contact of the filaments with the bath is maintained for a period of about ten seconds. The filaments are further extracted by immersion in each of three water baths maintained at a temperature of 20–25° C., resulting in an additional three minutes of extraction time. The solvent content of the product is thereby reduced to less than 1%. Following the removal of the filaments from the third extraction bath, the yarn is drawn 2.5X while passing through boiling water, and is wound up at a speed of about 25 yards per minute. The resulting product exhibits a tenacity/elongation/modulus rati of 3.0/12/41, and can be further drawn by conventional means, if desired.

Yarns comprising the polymer of the preceding three examples are utilized in the preparation of fabrics which exhibit a high degree of light stability and excellent wash-wear properties. A standard 118 × 86 taffeta fabric is prepared from a 70/30 yarn twisted to 7 t.p.i. Excellent wash-wear performance is noted when the fabric is subjected to a normal washing cycle in an automatic washer followed by tumbling dry in an automatic clothes dryer. A blouse constructed from taffeta fabric exhibits quite satisfactory wash-wear performance in an actual wear-test evaluation.

Additionally, a relatively wide range of experimental fabrics has been prepared in a variety of weights and constructions. Among the fabrics prepared have been taffetas, twills, broadcloths, failles, satins, and several novelty weaves. When properly finished, the fabrics comprising the polymers of this invention are found not to be sleazy when light or boardy when heavy, but to possess pleasing aesthetics and good covering power. Of the above fabric types, the taffetas, twills, and broadcloths exhibit excellent wash-wear performance, showing practically no visible wrinkling when washed in an automatic washing machine and tumbled dry in a home dryer, and only slight visible wrinkling when washed in an automatic home washing machine and dried by hanging after completion of the spin-dry cycle. Suitable finishing techniques may be varied within wide limits. An exemplary procedure includes heat-setting for a period of four minutes in air at a temperature within the range from about 230° to 235° C. while permitting about 3% warp shrinkage and 5% fill shrinkage, followed by a taut treatment for a period of about one hour in boiling aqueous 10% sodium hydroxide solution. In addition to the above fabrics prepared from continuous filaments of the polymers of this invention, poplin fabrics have also been prepared from a spun yarn comprising 65% staple of the preferred polyester of this invention and 35% Egyptian cotton staple, and found to possess pleasing fabric aesthetics and good wash-wear performance.

The polymers of this invention find wide utility in a variety of applications. They provide excellent protection as coating agents on metals, woods, etc. Polymer coatings resist scratching by nails and are not loosened by extended soaking in water. The polymers perhaps, however, exhibit their greatest utility in the form of self-supporting shaped articles as films, fibers, yarn, and the like. Because of their excellent thermal, hydrolytic, and light stability, films and fabrics find wide utility in a large number of domestic and industrial applications. The use of the polymers in these applications is enhanced by the high degree of fire resistance which they exhibit. Of probably the greatest utility are fabrics comprising the polymers of this invention which provide the first truly wash-wearable materials. In such applications, the fabrics are capable of being repeatedly washed and then worn without the necessity for ironing.

What is claimed is:

1. A polymer consisting essentially of recurring units conforming to the following structure:

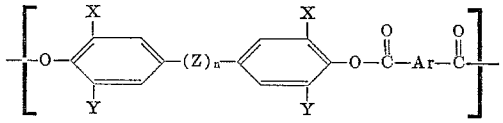

wherein Ar is selected from the group consisting of meta- and para-arylene and mixtures thereof; $n$ is a cardinal number of from 0 to 1; X is selected from the group consisting of halogen, alkyl of up to six carbon atoms, and alkoxy of up to six carbon atoms; Y is selected from the group consisting of hydrogen, halogen, alkyl of up to six carbon atoms and alkoxy of up to six carbon atoms with the proviso that X is halogen when Y is hydrogen; and Z represents a member of the group consisting of

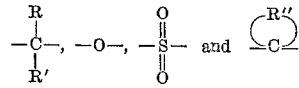

wherein R and R' are selected from the group consisting of hydrogen and alkyl of up to six carbon atoms, and R" is alkylene of up to six carbon atoms, said polymer having an inherent viscosity of at least 0.5 when measured at 30° C. as a solution of the polymer in a 40% sym-tetrachloroethane/60% phenol by weight solvent mixture at a concentration of 0.5 gm. of polymer per 100 ml. of solution.

2. Poly[4,4′ - isopropylidene bis(2,6 - dichlorophenyl) isophthalate], said polymer having an inherent viscosity of at least 0.5 when measured at 30° C. as a solution of the polymer in a 40% sym-tetrachloroethane/60% phenol by weight solvent mixture at a concentration of 0.5 gm. of polymer per 100 ml. of solution.

3. Poly[4,4′ - isopropylidene bis(2,6 - dimethylphenyl) isophthalate], said polymer having an inherent viscosity of at least 0.5 when measured at 30° C. as a solution of the polymer in a 40% sym-tetrachloroethane/60% phenol by weight solvent mixture at a concentration of 0.5 gm. of polymer per 100 ml. of solution.

4. Poly[4,4′-oxy bis(2,6-dichlorophenyl) isophthalate], said polymer having an inherent viscosity of at least 0.5 when measured at 30° C. as a solution of the polymer in a 40% sym-tetrachloroethane/60% phenol by weight solvent mixture at a concentration of 0.5 gm. of polymer per 100 ml. of solution.

5. Poly[4,4′-sulfonyl bis(2,6-dichlorophenyl)isophthalate], said polymer having an inherent viscosity of at least 0.5 when measured at 30° C. as a solution of the polymer in a 40% sym-tetrachloroethane/60% phenol by weight solvent mixture at a concentration of 0.5 gm. of polymer per 100 ml. of solution.

6. A spinning solution having from about 15 to 30% by weight of the polymer of claim 1 dissolved in a solvent selected from the class consisting of tetrahydrofuran, chloroform, cyclohexanone, N,N-dimethylacetamide and a mixture of 70% 1,1,2-trichloroethane and 30% trifluoroacetic acid.

7. A spinning solution having from about 15 to 30% by weight of poly[4,4′ - isopropylidene bis(2,6 - dichlorophenyl)isophthalate] dissolved in tetrahydrofuran.

8. A spinning solution in accordance with claim 6 wherein the solvent is N,N-dimethylacetamide.

9. An oriented filament of the polymer of claim 1.

10. A film of the polymer of claim 1.

11. An oriented filament comprising poly[4,4′-isopropylidene bis(2,6-dichlorophenyl)isophthalate].

12. A film comprising poly[4,4′-isopropylidene bis(2,6-dichlorophenyl)isophthalate].

13. The polymer of claim 3 in the form of an oriented filament.

14. The polymer of claim 3 in the form of a film.

15. A method comprising reacting a first liquid phase comprising a bisphenol of the formula:

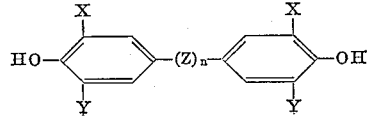

wherein X is selected from the group consisting of halogen, alkyl of up to six carbon atoms and alkoxy of up to six carbon atoms; n is a cardinal number of from 0 to 1; Y is selected from the group consisting of hydrogen, halogen, lower alkyl and lower alkoxy with the proviso that X is halogen when Y is hydrogen; and Z represents a member of the group consisting of

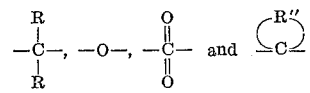

wherein R and R′ are selected from the group consisting of hydrogen and alkyl of up to six carbon atoms, and R″ is alkylene of up to six carbon atoms with a second liquid phase immiscible with said first liquid phase and comprising a diacid halide of the formula

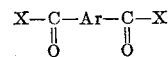

wherein X is halogen and Ar is selected from the group consisting of meta- and para-arylene, in the presence of a catalyst.

16. A method comprising reacting an aqueous phase containing 4,4′ - isopropylidene bis(2,6 - dimethylphenol) with an immiscible non-aqueous phase containing isophthaloyl chloride in the presence of tetraethylammonium chloride as the catalyst.

References Cited by the Examiner
UNITED STATES PATENTS

| | | | |
|---|---|---|---|
| 2,035,578 | 3/1936 | Wagner | 260—75 |
| 2,878,201 | 3/1959 | Beindoff et al. | 260—30.4 |
| 2,939,880 | 6/1960 | Montagna et al. | 260—30.4 |
| 2,965,613 | 12/1960 | Milone et al. | 260—32.8 |
| 3,028,364 | 4/1962 | Comix et al. | 260—49 |
| 3,036,990 | 5/1962 | Kantor et al. | 260—47 |
| 3,036,991 | 5/1962 | Kantor et al. | 260—47 |

FOREIGN PATENTS

| | | |
|---|---|---|
| 1,175,362 | 3/1959 | France. |
| 863,704 | 3/1961 | Great Britain. |

MORRIS LIEBMAN, *Primary Examiner.*

WILLIAM H. SHORT, *Examiner.*

UNITED STATES PATENT OFFICE
CERTIFICATE OF CORRECTION

Patent No. 3,234,167  February 8, 1966

Wilfred Sweeny

It is hereby certified that error appears in the above numbered patent requiring correction and that the said Letters Patent should read as corrected below.

Column 16, lines 10 to 14, the formula should appear as shown below instead of as in the patent:

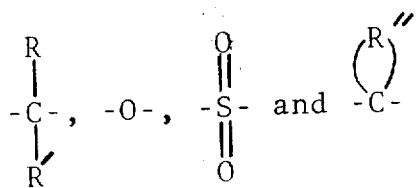

Signed and sealed this 3rd day of January 1967.

(SEAL)
Attest:

ERNEST W. SWIDER
Attesting Officer

EDWARD J. BRENNER
Commissioner of Patents